United States Patent
Cayre et al.

(10) Patent No.: US 7,908,865 B2
(45) Date of Patent: Mar. 22, 2011

(54) DEVICE FOR INJECTING A MIXTURE OF AIR AND FUEL, AND COMBUSTION CHAMBER AND TURBOMACHINE PROVIDED WITH SUCH A DEVICE

(75) Inventors: Alain Cayre, Pamfou (FR); Michel Andre Albert Desaulty, Vert St Denis (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 938 days.

(21) Appl. No.: 11/768,556

(22) Filed: Jun. 26, 2007

(65) Prior Publication Data

US 2008/0178597 A1 Jul. 31, 2008

(30) Foreign Application Priority Data

Jun. 29, 2006 (FR) ...................................... 06 05852

(51) Int. Cl.
*F23R 3/14* (2006.01)
*F23R 3/50* (2006.01)
(52) U.S. Cl. .............................. 60/748; 239/404; 60/800
(58) Field of Classification Search .................... 60/737, 60/748, 800; 239/403, 404, 405
See application file for complete search history.

(56) References Cited

U.S. PATENT DOCUMENTS

| | | | | |
|---|---|---|---|---|
| 3,866,413 | A | * | 2/1975 | Sturgess ........................... 60/748 |
| 5,154,060 | A | * | 10/1992 | Walker et al. .................... 60/746 |
| 5,816,049 | A | * | 10/1998 | Joshi ............................... 60/748 |
| 6,571,559 | B1 | * | 6/2003 | Fortuna et al. .................... 60/748 |
| 6,820,425 | B2 | * | 11/2004 | David et al. ...................... 60/743 |
| 7,617,689 | B2 | * | 11/2009 | Schumacher et al. ........... 60/748 |
| 2005/0044854 | A1 | * | 3/2005 | Cazalens et al. ................. 60/748 |

FOREIGN PATENT DOCUMENTS

| | | |
|---|---|---|
| EP | 1 158 246 A2 | 11/2001 |
| EP | 1 278 012 A2 | 1/2003 |
| EP | 1 314 933 A1 | 5/2003 |
| EP | 1 508 743 A2 | 2/2005 |

OTHER PUBLICATIONS

U.S. Appl. No. 11/941,551, filed Nov. 16, 2007, Sandelis.
U.S. Appl. No. 11/692,441, filed Mar. 28, 2007, Cayre, et al.

* cited by examiner

*Primary Examiner* — Ted Kim
(74) *Attorney, Agent, or Firm* — Oblon, Spivak, McClelland, Maier & Neustadt, L.L.P.

(57) ABSTRACT

A device for injecting a mixture of air and fuel into a combustion chamber of a turbomachine is disclosed. The injection device includes a novel sliding bushing and a novel annular cup for retaining the sliding bushing, making it possible to improve the air feed of the injection device.

13 Claims, 3 Drawing Sheets

DEVICE FOR INJECTING A MIXTURE OF AIR AND FUEL, AND COMBUSTION CHAMBER AND TURBOMACHINE PROVIDED WITH SUCH A DEVICE

BACKGROUND OF THE INVENTION AND DESCRIPTION OF THE PRIOR ART

The invention is concerned with the field of turbomachines and relates to a device for injecting a mixture of air and fuel into a combustion chamber of a turbomachine.

It relates more specifically to an injection device provided with a novel sliding bushing and with a novel annular cup for retaining the sliding bushing, making it possible to improve the air feed of the injection device.

Throughout the remainder of the description, the terms "upstream" or "downstream" will be used to denote the positions of the structural elements with respect to one another in the axial direction, taking the gas flow direction as reference. Likewise, the terms "internal" or "radially internal" and "external" or "radially external" will be used to denote the positions of the structural elements with respect to one another in the radial direction, taking the axis of rotation of the turbomachine or the axis of symmetry of the structure in question as reference.

A turbomachine comprises one or more compressors delivering pressurized air to a combustion chamber in which the air is mixed with fuel and ignited so as to generate hot combustion gases. These gases flow in the downstream direction of the chamber toward one or more turbines which convert the energy thus received in order to rotate the compressor or compressors and provide the necessary work, for example, to power an aircraft.

Typically, a combustion chamber used in aeronautics comprises an internal wall and an external wall interconnected at their upstream end by a chamber end wall. The chamber end wall has, spaced circumferentially, a plurality of openings each accommodating an injection device at the center of which an injector is positioned, the assembly allowing the mixture of air and fuel to be fed into the chamber.

The combustion chamber is supplied by liquid fuel mixed with air from a compressor. The liquid fuel is fed right to the chamber by the injectors in which it is vaporized into fine droplets. This vaporization is initiated in the region of the injector by means of nozzles and is continued particularly in the region of the venturi and the bowl by the effect of pressurized air from a compressor. This pressurized air passes, on the one hand, through the radial swirlers of the injection device so as to cause the fuel sprayed by the injector to rotate, and, on the other hand, through orifices formed in various parts of the injection device, such as the bowl.

As illustrated particularly in document FR 2 753 779, an injection device has a symmetry of revolution and comprises, arranged from upstream to downstream, a sliding bushing connected by an annular cup to radial swirlers. The radial swirlers comprise a venturi and are connected by their downstream end to a bowl with a divergent conical wall. The bowl is itself connected to the chamber end wall via a deflector. According to the prior art, the sliding bushing includes, arranged from upstream to downstream, an upstream wall of convergent conical shape extended by a cylindrical wall, which terminates downstream in an annular flange extending radially outward.

Owing to the convergent conical shape of its upstream part, the sliding bushing constitutes an obstacle that the air coming from the compressor must negotiate. Likewise, since the outside diameter of the annular cup, which serves as radial guide for the sliding bushing, is large, the annular cup itself constitutes an obstacle to be negotiated. This is the origin of air recirculation and substantial pressure drops deleterious to the air feed of the injection device. The spraying quality is therefore degraded, resulting in a larger droplet size, and a coke deposit may appear on the venturi and the bowl. The carburetion and therefore the performance are thus degraded.

SUMMARY OF THE INVENTION

The object of the invention is to produce an injection device for optimizing the air feed, while minimizing the pressure drops between the outlet of the compressor and the inside of the combustion chamber. This objective is achieved by specifying the profile and the shape of the sliding bushing and of the annular cup.

The invention makes it possible to solve this problem by providing an injection device comprising a sliding bushing and an annular cup, the geometries of which are such that the air coming from the compressor no longer encounters an obstacle in the upstream part of the injection device.

More specifically, the invention relates to a device for injecting a mixture of air and fuel into a combustion chamber of a turbomachine, the injection device having a symmetry of revolution about an axis and comprising, arranged from upstream to downstream in the gas flow direction, a sliding bushing at the center of which an injector is positioned, an annular cup retaining the sliding bushing axially, at least one radial swirler comprising a venturi, and connected by its downstream end to a bowl, which device is noteworthy in that the sliding bushing comprises, arranged from upstream to downstream, a cylindrical upstream part extended by a convergent conical intermediate part and terminating in an annular flange extending radially outward.

Advantageously, the annular cup comprises, arranged from upstream to downstream, a profiled upstream fairing extended by an annular flange extending radially inward.

Preferably, the profiled upstream fairing of the annular cup has a divergent conical shape and a convex external wall.

The cylindrical upstream part of the sliding bushing may comprise a beveled upstream face, the upstream face being inclined radially inward.

Preferably, the upstream face of the sliding bushing is inclined at an angle of about 45° to the axis of symmetry of the injection device.

The cylindrical upstream part of the sliding bushing may also be provided with an axial swirler.

Advantageously, the annular flange of the sliding bushing has a radially internal end provided with at least one row of orifices. The orifices of the row may be distributed in a regular fashion around the entire circumference of the annular flange and their axis may be generally parallel to the convergent conical intermediate part of the sliding bushing.

According to a preferred embodiment, when the bowl and the annular cup each have an external radius, the external radius of the bowl is between 1.1 and 1.2 times the value of the external radius of the annular cup. In this case, advantageously, the bowl has a divergent conical wall that makes an angle of between 70 and 130° with the axis of symmetry of the injection device.

Moreover, the invention also relates to a combustion chamber comprising an internal wall, an external wall, and a chamber end wall, and provided with at least one such injection device.

The invention finally relates to a turbomachine provided with such a combustion chamber.

BRIEF DESCRIPTION OF THE DRAWINGS

The invention will be better understood and other advantages thereof will become more clearly apparent in the light of the description of a preferred embodiment given by way of nonlimiting example and with reference to the appended drawings, in which.

DESCRIPTION OF THE PREFERRED EMBODIMENTS

Figure 1:
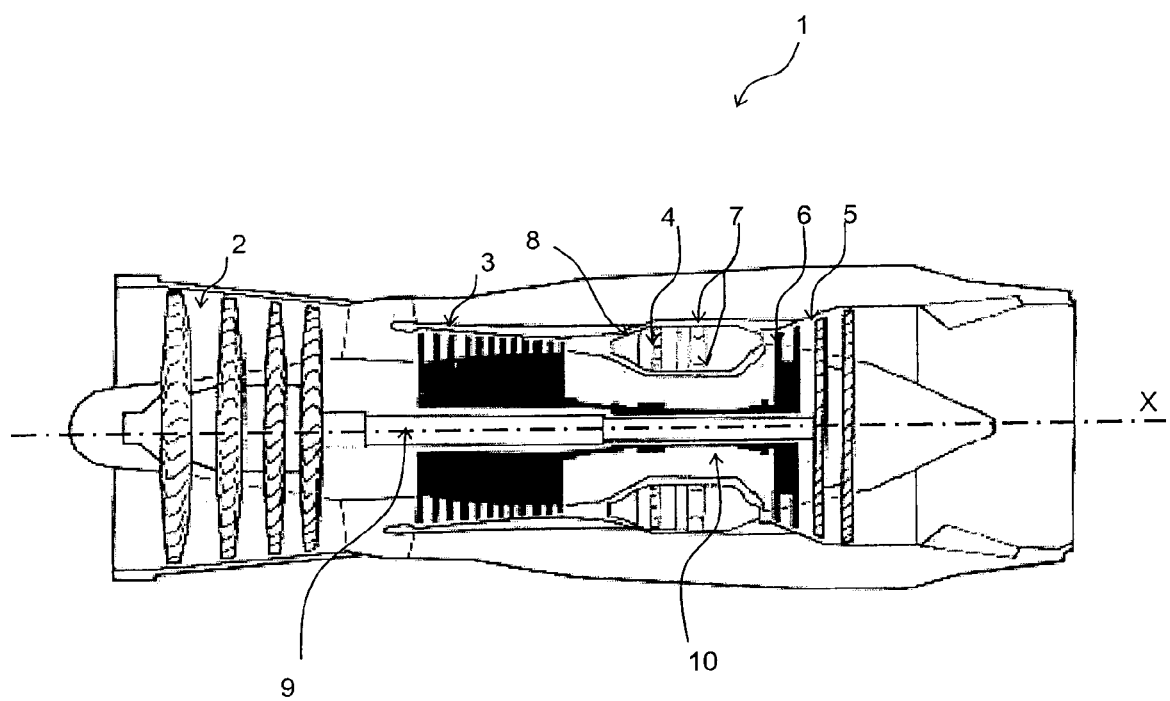
FIG. 1 is a schematic sectional view of a turbomachine, more specifically an aircraft jet engine.

FIG. 1 shows in section an overall view of a turbomachine 1, for example an aircraft jet engine, comprising a low-pressure compressor 2, a high-pressure compressor 3, a combustion chamber 4, a low-pressure turbine 5 and a high-pressure turbine 6. The combustion chamber 4 may be of the annular type and is defined by two annular walls 7 spaced radially to the axis X of rotation of the jet engine, these walls being connected at their upstream end to an annular chamber end wall 8. The chamber end wall 8 has a plurality of openings (not shown) with a regular circumferential spacing. In each of these openings is mounted an injection device. The combustion gases flow downstream in the combustion chamber 4 and then supply the turbines 5 and 6 which respectively drive the compressors 2 and 3, arranged upstream of the chamber end wall 8, by way of two respective shafts 9 and 10. The high-pressure compressor 3 supplies air to the injection devices and also to two annular spaces respectively arranged radially to the inside and outside of the combustion chamber 4. The air introduced into the combustion chamber 4 is involved in vaporizing the fuel and in its combustion. The air circulating outside the walls of the combustion chamber 2 is involved in cooling these walls and enters the chamber through dilution holes (not shown) in order to cool the combustion gases transmitted to the turbine.

Figure 2A:
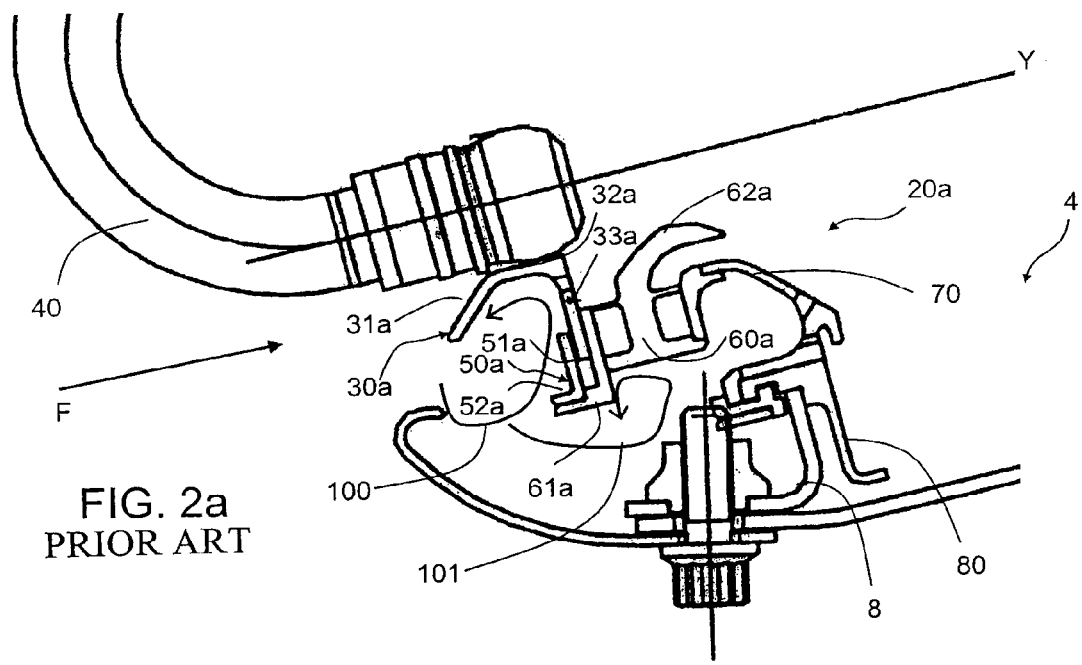
FIG. 2a is a schematic sectional view of the lower upstream part of a combustion chamber provided with an injection device according to the prior art.

FIG. 2a shows a schematic sectional view of the lower upstream part of a combustion chamber 4 provided with an injection device 20a according to the prior art, the axis of symmetry of revolution of which is identified by Y.

According to the prior art, the injection device 20a includes a sliding bushing 30a, at the center of which an injector 40 is positioned. The sliding bushing 30a is made up of a convergent conical upstream part 31a extended by a cylindrical part 32a of axis Y, this cylindrical part being provided at its downstream end with an annular flange 33a extending radially outward.

The convergent conical part 31a is inclined at about 45° to the axis Y and the function of this part is to guide the injector 40 when it is being mounted on the injection device. At the annular flange 33a, the sliding bushing 30a is retained axially by an annular cup 50a. The annular cup 50a has an annular flange 51a extending radially outward. Its outer radial end terminates in a cylindrical annular lip of axis Y pointing in the upstream direction. The annular cup 50a is connected to radial swirlers 60a, two in this instance, by way of its annular lip 52a which is connected, for example by brazing, to a lip 61a of corresponding shape, placed at the outer upstream end of the swirlers 60a. A space is provided axially between the annular flange 51a and the radial swirlers 60a so as to allow the sliding bushing 30a to move radially. This movement makes it possible to compensate for the relative displacements between the injector 40 and the injection device 20a. The swirlers 60a are provided with a venturi 62a and are connected via their inner downstream end to a bowl 70. The bowl 70 is fastened by means of a deflector 80 to the chamber end wall 8.

The shape of the upstream part 31a of the sliding bushing constitutes an obstacle to the flow of air F coming from the compressor and creates an air recirculation 100 resulting in pressure drops. Likewise, because of its shape, and in particular because of the presence of the annular lip 52a, the annular cup itself constitutes an obstacle, resulting in a recirculation of air 101 and pressure drops. This is the origin of poor air feed of the injection device 20a and results in particular in coke being deposited on the venturi 62a and on the bowl 70.

Figure 2B:
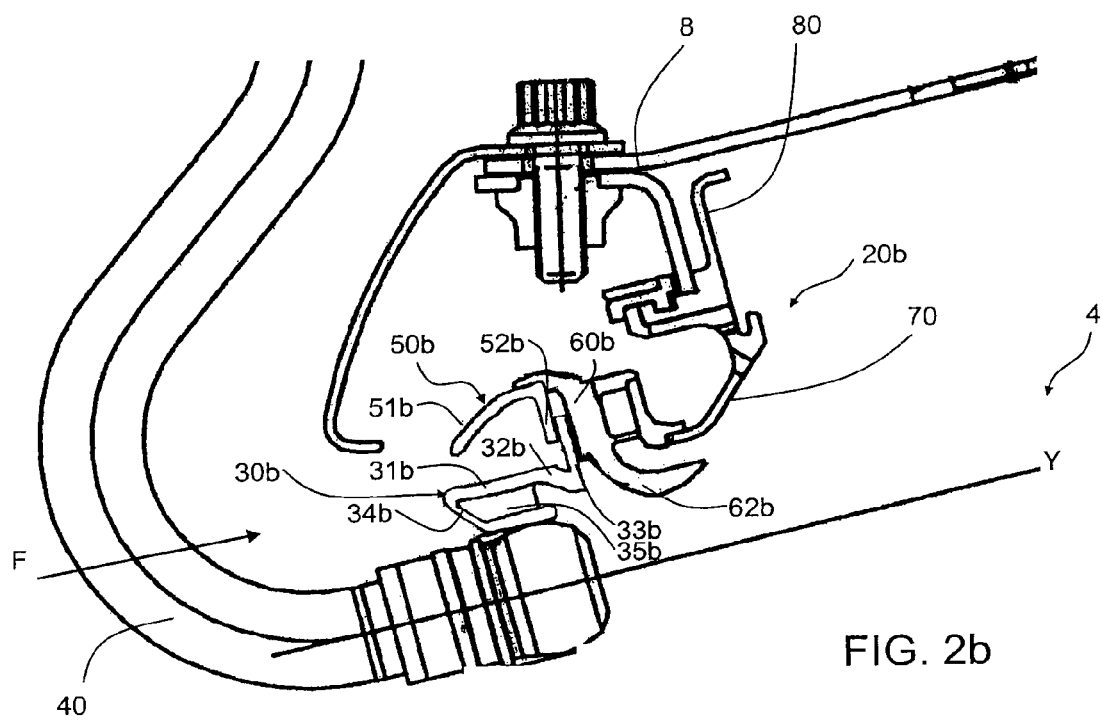
FIG. 2b is a schematic sectional view of the upper upstream part of a combustion chamber provided with an injection device according to the invention.

As illustrated in FIG. 2b, according to the invention the injection device 20b still has a sliding bushing 30b retained axially by an annular cup 50b, but their shapes are adapted so as to improve the air feed of the injection device 20b.

For this purpose, the sliding bushing 30b is made up, from the upstream end to the downstream end, of a cylindrical upstream part 31b extended by a convergent conical intermediate part 32b and terminating in an annular flange 33b extending radially outward. The cylindrical upstream part 31b has a beveled upstream part 34b, this upstream face being inclined radially inward at an angle of about 45°. This angle of inclination allows the sliding bushing according to the invention to fulfill its guide function when the injector 40 is being mounted. The cylindrical upstream part 31b may be provided with an axial swirler 35b for improving the air feed of the injection device by introducing air coming from the compressor at the downstream end of the injector 40. The conical intermediate part 32b has an axial dimension and an angle of inclination that are adapted so as to connect the upstream part 31b and the annular flange 33b, while still guiding the air output by the axial swirler 35b.

The sliding bushing 30b is retained axially on its annular flange 33b by the annular cup 50b. The annular cup 50b includes a profiled upstream fairing 51b. This upstream fairing 51b has a generally divergent conical shape, its wall being slightly convex. The upstream fairing 51b is extended by an annular flange 52b extending radially inward. The annular cup 50b is connected, at the connection between the upstream fairing 51b and the annular flange 52b, to one or more radial swirlers 60b. In the example shown here, the injection device 20b is provided with a single radial swirler 60b which is provided with a venturi 62b. A space is provided axially between the annular flange 52b and the radial swirler 60b so as to allow the sliding bushing 30b to move radially. The radial swirler 60b is connected via its inner downstream end to a bowl 70, which is itself attached to the chamber end wall 8 via a deflector 80.

Thanks to the convergent upper part on the sliding bushing 30b being replaced with a cylindrical upstream part 31b, and thanks to the divergent convex shape of the upstream fairing 51b of the annular cup 50b, the obstacles to the flow of air F are eliminated and the air coming from the compressor is guided into the radial swirler 60b and the bowl 70 without any shape dislocation, and therefore without any pressure drop. In addition, when the sliding bushing 30b is provided with an axial swirler 35b, the axial swirler 35b has the same effect on the carburetion as the radial swirler placed upstream of the venturi 62b of the injection device according to the prior art. It also makes it possible to create a film of air along the internal wall of the venturi 62b, which prevents coke from forming on the venturi. The combination of improvements made to the injection device 20b makes it possible to improve its air feed and in addition prevents coke formation.

Figure 3:
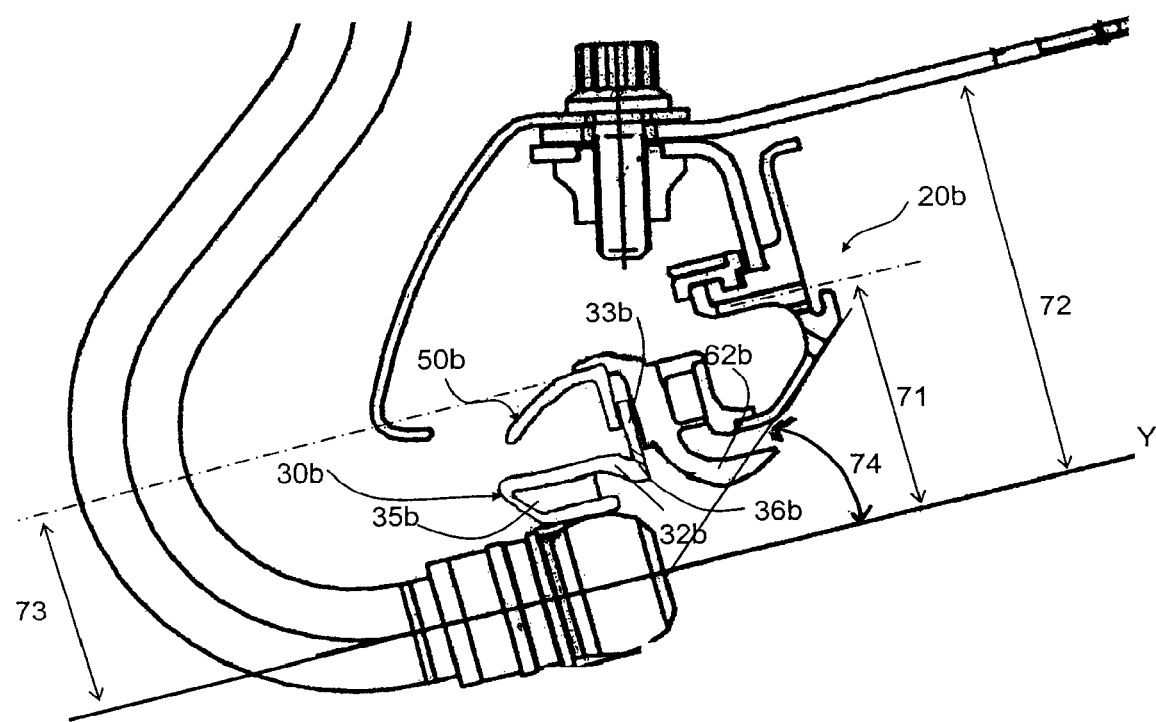
FIG. 3 is a schematic sectional view of the upper upstream part of a combustion chamber provided with an alternative embodiment of an injection device according to the invention.

The anticoke film coming from the axial swirler 35b may be replaced, or its effect may be enhanced, by providing, as illustrated in FIG. 3, a row of orifices 36b on the radially internal end of the annular flange 33b of the sliding bushing 30b. These orifices 36b may or may not be distributed in a regular fashion over the entire circumference of the annular flange 33b. Preferably, their axis is parallel to the convergent conical intermediate part 32b, both being arranged so that the air coming from the axial swirler 35b and from the orifices 36b flows along the internal surface of the venturi 62b.

Preferably, but not solely, the invention applies to injection devices for which the outer radius 71 of the bowl 70 is large enough to allow its optimum implantation. More precisely, the invention is particularly suitable for injection devices having an outer radius 71 of the bowl 70 between 0.5 and 0.7 times the internal radius 72 of the chamber taken directly downstream of the injection device.

Moreover, in order for the air feed of the injection device to be optimum, the outer radius 71 of the bowl must be between 1.1 and 1.2 times the outer radius 73 of the annular cup 50b. When this criterion is met, if it is desired to limit the axial extent of the injection device, the angle 74 between the divergent part of the bowl 70 and the axis of symmetry Y of the injection device 20b must be between 70° and 130°.

The invention claimed is:

1. A device for injecting a mixture of air and fuel into a combustion chamber of a turbomachine, the injection device having a symmetry of revolution about an axis and comprising, arranged from upstream to downstream in the gas flow direction:
    a sliding bushing including, arranged from upstream to downstream, a cylindrical upstream part, a convergent conical intermediate part, and an annular flange extending radially outward;
    an injector positioned at a center of the sliding bushing which injects the mixture into the combustion chamber;
    an annular cup which retains the sliding bushing axially, the annular cup including, arranged upstream to downstream, a profiled upstream fairing and an annular flange extending radially inward;
    at least one radial swirler comprising a venturi and
    a bowl connected to a downstream end of the radial swirler, wherein the cylindrical upstream part includes a first radially outer cylindrical portion, a second radially inner cylindrical portion, and a beveled upstream face inclined radially inward which connects the first radially outer cylindrical portion and the second radially inner cylindrical portion, and
    wherein the injector is positioned within the second radially inner cylindrical portion.

2. The injection device as claimed in claim 1, wherein the upstream face of the cylindrical upstream part of the sliding bushing is inclined at an angle of about 45° to the axis of symmetry of the injection device.

3. The injection device as claimed in claim 1, wherein the cylindrical upstream part of the sliding bushing is provided with an axial swirler.

4. The injection device as claimed in claim 3, wherein the axial swirler is disposed between the first radially outer cylindrical portion and the second radially inner cylindrical portion.

5. The injection device as claimed in claim 1, wherein the annular flange of the sliding bushing has a radially internal end provided with at least one row of orifices.

6. The injection device as claimed in claim 5, wherein the orifices of the row are distributed in a regular fashion around the entire circumference of the annular flange.

7. The injection device as claimed in claim 5, wherein the orifices of the row have an axis generally parallel to the convergent conical intermediate part of the sliding bushing.

8. The injection device as claimed in claim 1, wherein, when the bowl and the annular cup each have an external radius, the external radius of the bowl is between 1.1 and 1.2 times the value of the external radius of the annular cup.

9. The injection device as claimed in claim 8, wherein the bowl has a divergent conical wall that makes an angle of between 70 and 130° with the axis of symmetry of the injection device.

10. A combustion chamber of a turbomachine comprising an internal wall, an external wall, and a chamber end wall, wherein the combustion chamber is provided with at least one injection device as claimed in claim 1.

11. A turbomachine provided with a combustion chamber as claimed in claim 10.

12. The injection device as claimed in claim 1, wherein a first upstream end of the profiled upstream fairing is free and a second downstream end of the profiled upstream fairing is connected to the annular flange, and the first upstream end of the profiled upstream fairing is radially inward of the second downstream end of the profiled upstream fairing.

13. The injection device as claimed in claim 1, wherein the annular flange of the sliding bushing is disposed in a space provided between the radial swirler and the annular flange of the annular cup so as to allow the sliding bush to move radially.

* * * * *